United States Patent
Park

(10) Patent No.: US 8,462,294 B2
(45) Date of Patent: Jun. 11, 2013

(54) BACKLIGHT UNIT AND LIQUID CRYSTAL DISPLAY DEVICE HAVING THE SAME

(75) Inventor: Chin Il Park, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 119 days.

(21) Appl. No.: 12/318,164

(22) Filed: Dec. 22, 2008

(65) Prior Publication Data

US 2009/0279021 A1  Nov. 12, 2009

(30) Foreign Application Priority Data

May 8, 2008  (KR) .................. 10-2008-0042860

(51) Int. Cl.
*G02F 1/1335*  (2006.01)
*F21V 7/04*  (2006.01)

(52) U.S. Cl.
USPC .................. 349/65; 349/67; 362/609

(58) Field of Classification Search
None
See application file for complete search history.

(56) References Cited

U.S. PATENT DOCUMENTS

| | | | | |
|---|---|---|---|---|
| 6,343,868 | B1 * | 2/2002 | Itoh | 362/609 |
| 2007/0139958 | A1 * | 6/2007 | Wu et al. | 362/600 |
| 2007/0230217 | A1 * | 10/2007 | Sakaki | 362/624 |

* cited by examiner

*Primary Examiner* — Hemang Sanghavi
(74) *Attorney, Agent, or Firm* — McKenna Long & Aldridge LLP

(57) ABSTRACT

A backlight unit is provided and includes a light source emitting light, a light guide plate disposed parallel to the light source, and a reflective sheet disposed at a bottom of the light guide plate. One side of the reflective sheet is slanted toward the light guide plate. A reflective member includes three sides surrounding the light source and a slanted fourth side supporting a slanted bottom of the reflective sheet. A bottom cover contacts the three sides of the reflective member.

8 Claims, 3 Drawing Sheets

BACKLIGHT UNIT AND LIQUID CRYSTAL DISPLAY DEVICE HAVING THE SAME

The present application claims priority under 35 U.S.C. 119 and 35 U.S.C. 365 to Korean Patent Application No. 10-2008-0042860 filed on May 8, 2008, which is hereby incorporated by reference in its entirety.

BACKGROUND OF THE INVENTION

1. Field of the Invention

The present invention relates to a backlight unit capable of improving the bright light generation and a liquid crystal display device having the same.

2. Discussion of the Related Art

Based on rapidly developing semiconductor technologies, demands on compact and light flat display devices with high performance are drastically increasing.

A liquid crystal display device (LCD) receiving public attention recently among the flat display devices has various advantages such as compactness, lightness, and low power consumption. That is, the LCD gradually attracts public interest as a substitute means capable of overcoming limitations of a cathode ray tube (CRT) and thus becomes widely used in almost all information processing devices that require a display unit.

The LCD injects a liquid crystal material between a color filter substrate having a common electrode and a color filter and an array substrate having a thin film transistor and a pixel electrode, and then applies respectively different electric potentials on the pixel electrode and the common electrode. Therefore, the LCD changes arrangements of liquid crystal molecules, thereby adjusting transmittance of light in order to display an image.

Since a liquid crystal display panel including the color filter substrate, the array substrate, and the liquid crystal is a light receiving device that does not emit light by itself, it includes a backlight unit at its bottom in order to provide light.

The backlight unit includes a light source, a light source housing surrounding the light source to prevent light loss, a light guide plate converting a light emitted from the light source into a plane light, a reflective sheet disposed on the rear of the light guide plate, and optical sheets disposed on the light guide plate.

The light source extensively uses a cold cathode fluorescent lamp (CCFL) having relatively less emitted heat and a long life span and also generating a white light close to a natural light. Additionally, a medium/small LCD commonly uses a light emitting diode (LED) having compactness, excellent color reproduction, and also less power consumption.

However, when the backlight unit of the above structure is bent due to pressure from the external, a gap between a light guide plate and a reflective sheet is formed and a portion of light is incident to the gap. Thus, the bright line occurs around the gap. That is, if components of the backlight unit move freely or are modified by the external conditions in a related art LCD, light leaks from an edge area between the light guide plate and the reflective sheet and then directly enters the liquid crystal display panel. Therefore, the edge area is brighter than other areas in an effective screen display unit.

SUMMARY OF THE INVENTION

Accordingly, the present invention is directed to a backlight unit and liquid crystal display device that substantially obviates one or more of the problems due to limitations and disadvantages of the related art.

An advantage of the present invention is to provide a backlight unit capable of improving the bright line generation and a liquid crystal display device having the same.

Additional advantages, and features of the invention will be set forth in part in the description which follows, and in part will become apparent from the description or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit comprises a light source emitting light, a light guide plate disposed parallel to the light source, a reflective sheet disposed at a bottom of the light guide plate, one side of the reflective sheet being slanted toward the light guide plate, a reflective member including three sides surrounding the light source and a slanted fourth side to support a slanted bottom of the reflective sheet, and a bottom cover contacting the three sides of the reflective member.

In another aspect of the present invention, a liquid crystal display device comprises a liquid crystal display panel, a light source emitting light to be projected on the liquid crystal display panel, a light guide plate disposed parallel to the light source, a reflective sheet disposed at a bottom of the light guide plate, one side of the reflective sheet corresponding to the light source and being slanted toward the light guide plate, a reflective member including three sides surrounding the light source and a slanted fourth side to support a slanted bottom of the reflective sheet, and a bottom cover adapted to contact three sides of the reflective member.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE EMBODIMENTS

Figure 1:
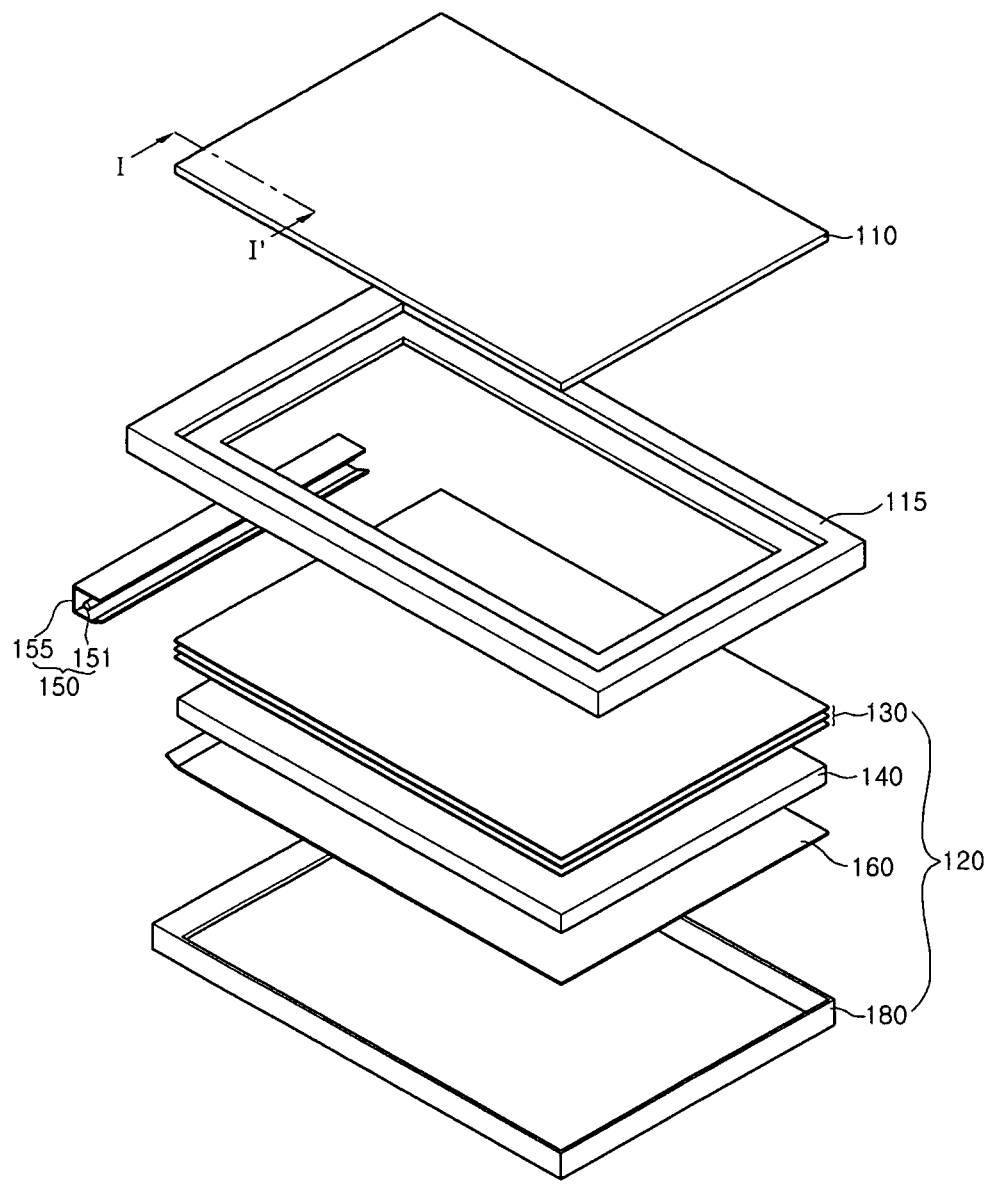
FIG. 1 is an exploded perspective view of a liquid crystal display device according to one embodiment of the present invention.

Reference will now be made in detail to the embodiments of the present disclosure, examples of which are illustrated in the accompanying drawings.

As illustrated in FIGS. 1 to 4, a liquid crystal display device according to an embodiment includes a liquid crystal display panel 110 for displaying an image, a backlight unit 120 disposed below the bottom of the liquid crystal display panel 110 to provide light, and a panel guide 115 for supporting the edge of the liquid crystal display panel 110 and coupled to the backlight unit 120.

The liquid crystal display panel 110 includes a thin film transistor substrate (not shown) including a plurality of thin film transistors (TFTs), a color filter substrate disposed on the TFT, and a liquid crystal interposed therebetween. The color filter substrate on the thin film transistor substrate is a substrate where R, G, and B color filters for displaying colors while light is transmitted are formed through a thin film process. A common electrode formed of indium tin oxide (ITO) is deposited on the R, G, and B color filters. Additionally, an integrated circuit (IC) chip is disposed on one end of the thin film transistor substrate. The IC chip generates an image signal and a scan signal to drive the liquid crystal display device and also generates a plurality of timing signals for applying them. Then, the IC chip applies the image signal and the scan signal to a gate line and a data line of the liquid crystal display panel 110.

The backlight unit 120 disposed at the rear of the liquid crystal display panel 110 for providing light includes a bottom cover 180 with the open top, a light source unit 150 received at one side of the bottom cover 180, a light guide plate 140 for converting a line light parallel to the light source unit 150 into a plane light, an optical sheets 130 disposed on the top of the light guide plate 140 to diffuse and collect light, and a reflective sheet 160 disposed at the bottom of the light guide plate 140 to guide light incident to the light guide plate 140 toward the optical sheets 130.

The light source unit 150 includes a lamp 151 for emitting light and a reflective member 155 for guiding light emitted from the lamp 151 toward the light guide plate 140.

The lamp 151 includes one of a cold cathode fluorescent lamp (CCFL) having electrodes at the both ends of a glass tube and an external electrode fluorescent lamp (EEFL) surrounding the both ends of a glass tube.

The lamp 151 disposed at one side of the light guide plate 140 is exemplary and the present invention is not limited thereto. That is, the lamp 151 can be disposed at the both sides of the light guide plate 140. Moreover, a light emitting diode (LED) as a light source can be used instead of the lamp 151.

Figure 2:
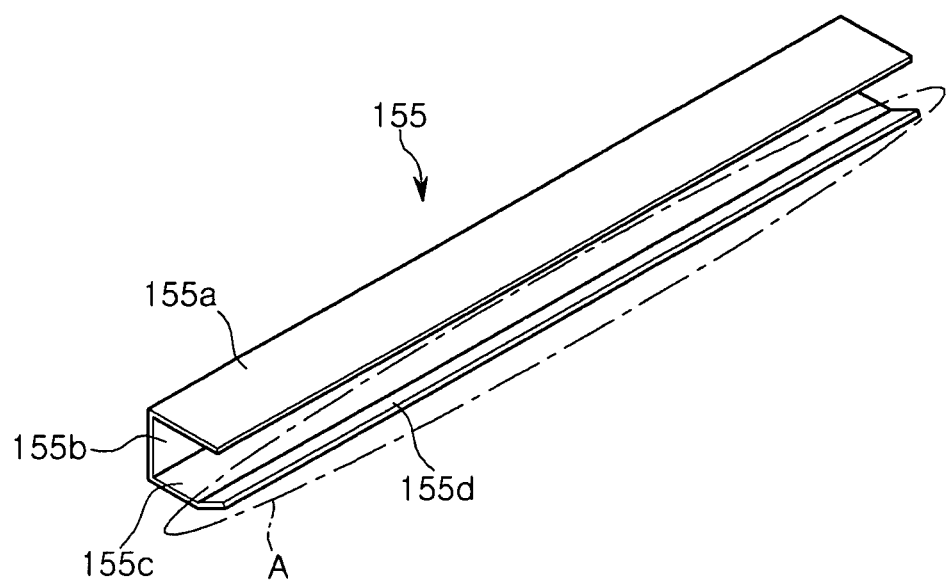
FIG. 2 is a perspective view of a reflective member of FIG. 1.
Figure 3:
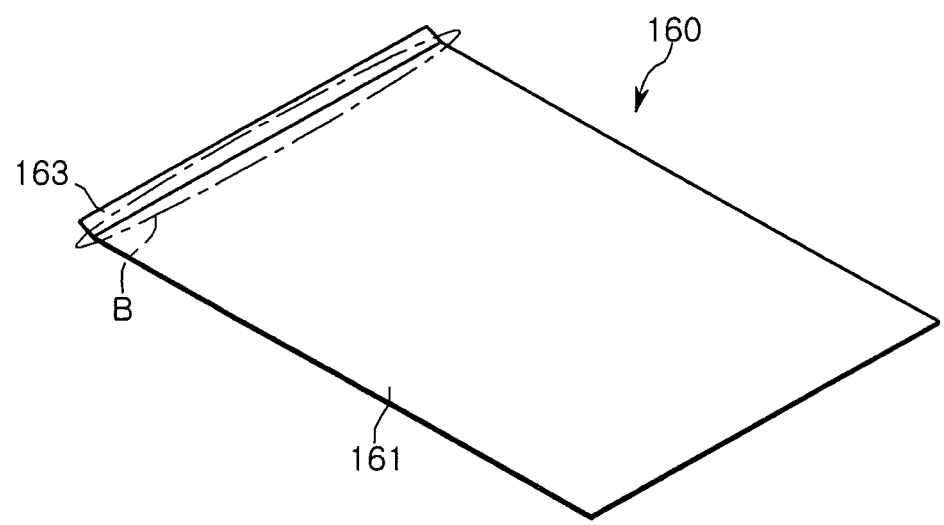
FIG. 3 is a perspective view of a reflective sheet of FIG. 1.

The reflective member 155 is formed of a material capable of reflecting light and includes four sides surrounding the lamp 151. As illustrated in FIG. 2, the reflective member 155 includes a first side 155a on the top of the lamp 151, a second side 155b facing the side of the bottom cover 180, a third side 155c facing the bottom of the bottom cover 180, and the fourth side 155d bent from the end of the third side 155c.

The third side 155c and the fourth side 155d are divided based on a first bending region A with a uniformly slanted form.

The first to fourth sides 155a, 155b, 155c, and 155d are integrated into one body, and are formed of the same material as the reflective sheet 160. That is, the reflective member 155 is formed of a material such as polyester (PET) of high reflectivity, for example.

The reflective sheet 160 is disposed at the bottom of the light guide plate 140, and is divided into a first reflective sheet 161 and a second reflective sheet 163 based on a second bending region B corresponding to the side of the light guide plate 140.

The first and second reflective sheets 161 and 163 are integrated into one body, and the second reflective sheet 163 is bent from the first reflective sheet 161 by the second bending region B.

The first and second reflective sheets 161 and 163 have elasticity and the second reflective sheet 163 corresponds to a side length direction of the light guide plate 140.

The second reflective sheet 163 is supported by the fourth side 155d of the reflective member 155 such that the bottom of the light guide plate 140 and the reflective sheet 160 closely contact each other.

The light guide plate 140 converts a line light incident from the lamp 151 into a plane light. Thus, the plane light reaches a place far from the lamp 151. The light guide plate 140 guides the incident light toward the liquid crystal display panel 110.

The light guide plate 140 generally has high solidity and thus is not easily modified or broken and may be formed of Polymethylmethacrylate (PMMA), for example, having high transmittance.

The optical sheets 130 includes a diffuse sheet for diffusing light, a light collect sheet for collecting the diffused light, and a protect sheet for protecting patterns formed on the light collect sheet.

The bottom cover 180 has a structure surrounding the reflective member 155 of the light source unit 150 at the side where the light source unit 150 is received. That is, one side of the bottom cover 180 where the light source unit 150 is received includes a top that contacts the first side 155a of the reflective member 155.

Accordingly, the reflective member 155 of the light source unit 150 contacts the inner side of the bottom cover 180.

Figure 4:
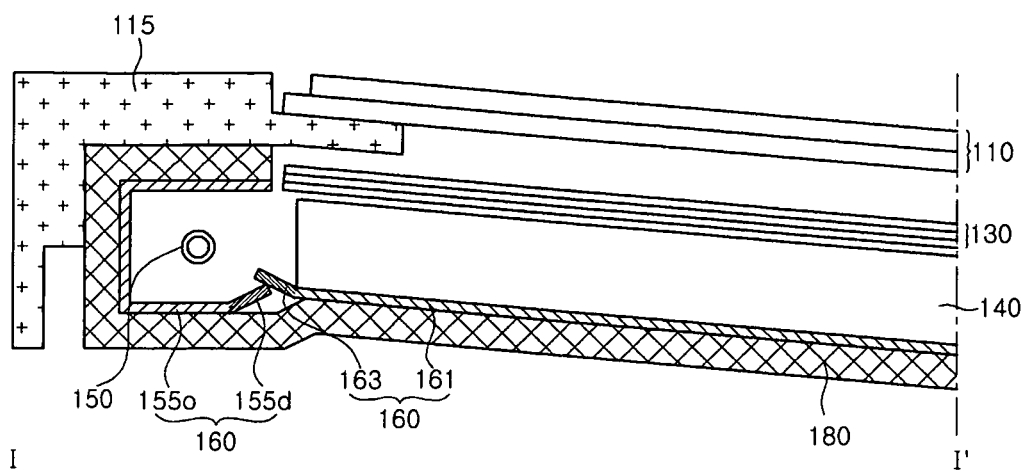
FIG. 4 is a cross-sectional view taken along a line I-I' of FIG. 1.

Referring to FIG. 4, when the liquid crystal display device is bent by the external pressure, the fourth side 155d of the reflective member 155 contacts the bottom of the second reflective sheet 163. Thus, a gap formed between the light guide plate 140 and the reflective sheet 160 due to the bending of the liquid crystal display device can be prevented.

The fourth side 55d of the reflective member 155 has a predetermined tilt angle and the second reflective sheet 163 has a predetermined tilt angle symmetric to that of the fourth side 155d.

Because the reflective member 155 and the reflective sheet 160 are formed of a material having a predetermined elasticity, even if the liquid crystal display device is bent by the external pressure, a gap between the reflective sheet 160 and the light guide plate 140 can be prevented.

The liquid crystal display device has the above-mentioned structure where the fourth side 155d slanted by the first bending region A of the reflective member 155 supports the bottom of the second reflective sheet 163 slanted by the second bending region B. Thus, a gap between the light guide plate 140 and the reflective sheet 160, formed by the bending of the liquid crystal display device due to the external pressure, can be prevented to improve the bright line generation.

Additionally, because the present invention includes the reflective member 155, the weight of the liquid crystal display device can be reduced.

Moreover, the present invention has a structure where the bottom cover 180 includes the bent side for contacting the reflective member 155. Bending due to the external pressure can be reduced and also assembly of the liquid crystal display device can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
a light source emitting light;
a light guide plate disposed parallel to the light source;
a reflective sheet disposed at a bottom of the light guide plate, one side of the reflective sheet being slanted toward the light guide plate;
a reflective member including three sides surrounding the light source and a slanted fourth side to support a slanted bottom of the reflective sheet; and
a bottom cover including a bent side, wherein the bent side contacts the three sides of the reflective member,
wherein the fourth side forms an end edge of a third side of the reflective member and positioned at a bottom of the light source, the end edge is a terminus of the reflective member,
wherein the bottom of the reflective sheet is contacted to an end edge of the fourth side of the reflective member,
wherein the reflective member is disposed by a fixed distance from an outside of the light guide plate,
wherein the fourth side is positioned at an end edge of a bottom surface of the reflective member,
wherein the reflective sheet comprises a first reflective sheet adapted to contact the bottom of the light guide plate and a second reflective sheet slanted toward the light guide plate, and
wherein the whole of an upper surface of the first reflective sheet is contacted with the whole of a lower surface of the light guide plate.

2. The backlight unit of claim 1, wherein the fourth side of the reflective member is bent from an end edge of the third side.

3. The backlight unit of claim 1, wherein the reflective member and the reflective sheet are formed of the same material.

4. The backlight unit of claim 1, wherein the fourth side of the reflective member and the second reflective sheet are symmetrically slanted to each other.

5. A liquid crystal display device comprising:
a liquid crystal display panel;
a light source emitting light to be projected on the liquid crystal display panel;
a light guide plate disposed parallel to the light source;
a reflective sheet disposed at a bottom of the light guide plate, one side of the reflective sheet corresponding to the light source and being slanted toward the light guide plate;
a reflective member including three sides surrounding the light source and a slanted fourth side to support a slanted bottom of the reflective sheet; and
a bottom cover including a bent side, wherein the bent side contacts three sides of the reflective member,
wherein the fourth side forms an end edge of a third side of the reflective member and positioned at a bottom of the light source, the end edge is a terminus of the reflective member,
wherein the bottom of the reflective sheet is contacted to an end edge of the fourth side of the reflective member,
wherein the reflective member is disposed by a fixed distance from an outside of the light guide plate,
wherein the fourth side is positioned at an end edge of a bottom surface of the reflective member,
wherein the reflective sheet comprises a first reflective sheet adapted to contact the bottom of the light guide plate and a second reflective sheet slanted toward the light guide plate, and
wherein the whole of an upper surface of the first reflective sheet is contacted with the whole of a lower surface of the light guide plate.

6. The liquid crystal display device of claim 5, wherein the fourth side of the reflective member is bent from an end edge of the third side.

7. The liquid crystal display device of claim 5, wherein the reflective member and the reflective sheet are formed of the same material.

8. The liquid crystal display device of claim 5, wherein the fourth side of the reflective member and the second reflective sheet are symmetrically slanted to each other.

* * * * *